Feb. 12, 1924.　　　　F. G. WHITTINGTON　　　　1,483,142
AUTOMOBILE BUMPER
Filed Oct. 2, 1920
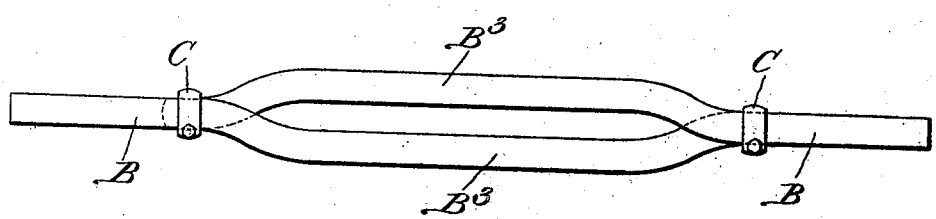
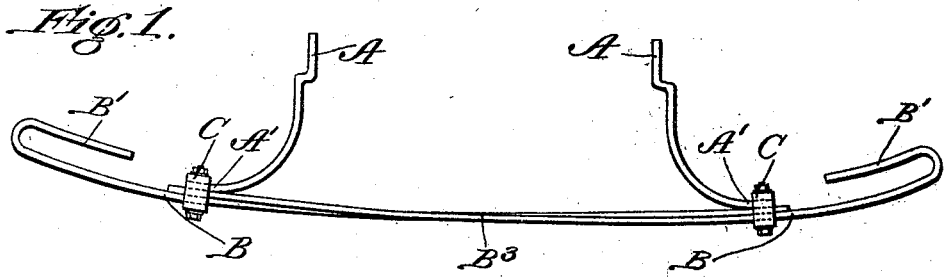
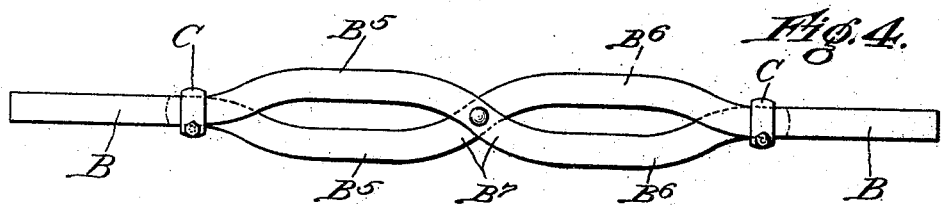
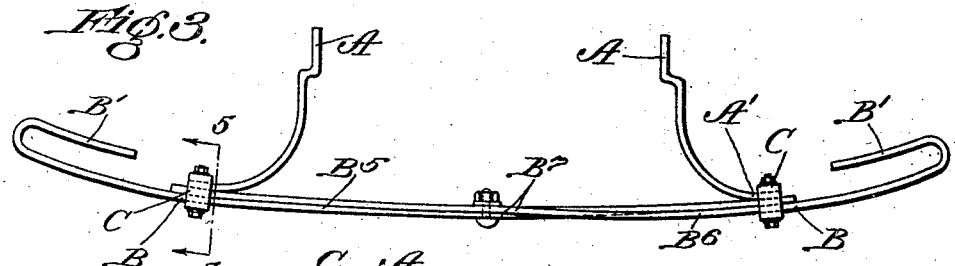
WITNESS:
P. F. Gathmann
INVENTOR
Frederik G. Whittington
BY Burton Burton
HIS ATTORNEYS Patented Feb. 12, 1924.

1,483,142

UNITED STATES PATENT OFFICE.

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF ILLINOIS.

AUTOMOBILE BUMPER.

Application filed October 2, 1920. Serial No. 414,300.

*To all whom it may concern:*

Be it known that I, FREDERIK G. WHITTINGTON, a citizen of the United States, residing at the city of Chicago, in the county of Cook and the State of Illinois, have invented certain new and useful Improvements in Automobile Bumpers, of which the following is a specification, reference being had to the accompanying drawings, forming a part thereof.

The purpose of this invention is to provide an improved construction of automobile bumpers adapted to afford more complete protection, and to be produced at less cost, than bumpers of a similar type heretofore made. It consists in the elements and features of construction shown and described, as indicated in the claims.

In the drawings:

Figure 1 is a plan view of a bumper embodying this invention, comprising the impact bar supporting arms, but without the means of attaching or mounting it on the vehicle.

Figure 2 is a front elevation of the same.

Figure 3 is a plan view and Figure 4 a front elevation of a modified form.

Figure 5 is a section at the line, 5—5, on Figure 4.

In the drawings there is shown in Figures 1 and 2, a bumper comprising supporting spring arms, A, A, having their rear ends adapted for securement in some manner to the vehicle frame, and their forward ends flexed outwardly so as to present directly forwardly facing surfaces for lapping against and securement to the impact member. The impact member is shown comprising two identically formed parts, each consisting of a flat bar B, having one end reflexed rearwardly and inwardly to form an inwardly-open resilient loop, $B^1$, the other end terminating without flexure,—that is, projecting directly transversely, and the portion intermediate the last mentioned end and the reflexed end deflected edgewise out of alignment with the remainder, as seen at $B^3$. The two parts, B, B, of the impact member are mounted in reverse position with the transversely terminating end of each lapped upon the transversely-extending portion of the other situated at the opposite end of the edgewise deflected portion, so that said two deflected portions stand parallel to each other, one above and the other below an interval or opening left between them which is desirably not materially greater than the width of each of said bars. Preferably the directly transversely terminating end of each of the parts of the impact member is lapped behind the other member, so that said end is concealed in front view, and the bumper impact member is caused to present an appearance as if integral,—no ends appearing except the two reflected ends forming the resilient loops mentioned. This causes the two parallel bars at the deflected parts of the two members to cross one above the other, as may be seen in plan view of Figure 1. The two parts of the bumper member, lapped one upon the other as described, are secured together by clamps, C, C, encompassing them at their lap, and the forward outwardly extending ends $A^1$, $A^1$, of the supporting arms, A, A, are desirably engaged in the same clamps as shown. The extent of lap of the two parts of the impact member and of the outwardly extending end portion of the supporting arm is designed to be sufficient to permit adjustment of the supporting arms to vary their distance apart to accommodate vehicles of different widths of frame.

In Figures 3 and 4 there is shown a modification of this structure which consists of making the impact member with each of its bars having two deflections in opposite edgewise directions, as seen at $B^5$, $B^6$, involving an obliquely transverse portion, $B^7$, connecting said oppositely deflected parts. In assembling the two parts of the bumper in this form, and in reverse position as in the case of the other form, the directly transversely terminating end of each member is lapped behind the other member; and of necessity, one of the transverse parts $b^7$, is lapped in front of the other.

The construction shown in Figures 3 and 4 have a certain advantage over that in Figures 1 and 2, consisting in that the cross-bars, $B^7$, $B^7$, operate to prevent a bumper of another car which may be encountered and which happens to be narrow enough to pass between the upper and lower bars, from doing so.

I claim:

1. An automobile bumper comprising two similarly formed flat bar members, each having a portion commencing nearer one end than the other and extending toward the middle, deflected edgewise a relatively short distance, and said other end portion reflexed rearward and inward behind the undeflected part to form an inwardly-open resilient loop or hook, the two members being reversely positioned for lapping the first mentioned end of each on the forward portion of the other end of the other bar member; whereby the deflected portions of the two bar members constitute respectively an upper and a lower impact bar spaced apart a relatively short distance.

2. In the construction defined in claim 1, foregoing, the first mentioned end of each of the two impact bar members being both lapped on the same surface,—front or rear,—of the other bar; whereby the two deflected parts of the two bars are caused to cross one above the other.

3. In the construction defined in claim 1, foregoing, the first mentioned end of each of the two bars being both lapped on the rear surface of the other bar; whereby said lapped ends are hidden from view and the appearance of a unitary impact member is produced.

4. In the construction defined in claim 1, foregoing, the edgewise deflections comprising two parts offset edgewise in opposite directions, and a transversely extending portion connecting said oppositely-offset portions; whereby the space between the oppositely offset portions of the impact member as a whole is crossed and subdivided into two relatively short spaces.

In testimony whereof, I have hereunto set my hand at Chicago, Illinois, this 30th day of September, 1920.

FREDERIK G. WHITTINGTON.